Patented June 4, 1935

2,003,386

UNITED STATES PATENT OFFICE 2,003,386

PROCESS FOR THE PRODUCTION OF HYDROXYALKYLATED AMINO COMPOUNDS

Henry Charles Olpin and Sydney Hubert Bannister, Spondon, near Derby, England, assignors to Celanese Corporation of America, a corporation of Delaware No Drawing. Application August 19, 1930, Serial No. 476,442. In Great Britain September 26, 1929

6 Claims. (Cl. 260—128)

This invention relates to the manufacture of hydroxyalkylated amino compounds and particularly to the preparation of hydroxyalkylated derivatives of aromatic amines.

The preparation of hydroxyalkylated amino compounds can be effected as is known by interaction of amino compounds and alkylene chlorhydrins or alkylene oxides, but in many cases the yields of the desired hydroxyalkylated amines are poor and the products impure due to the formation of undesirable by-products which are difficult to separate from the compounds required.

According to the present invention the preparation of hydroxyalkylated amino compounds, and particularly hydroxyalkylated derivatives of aromatic amines, by interaction of the appropriate amino compound and an alkylene halogen-hydrin, alkylene oxide or other hydroxyalkylating agent, is effected in the presence of a hydrocarbon. By operating in this manner in the presence of a hydrocarbon it has been found possible to prepare hydroxyalkylated amino compounds in very good yield and in an exceptionally pure state.

The hydrocarbon may be any convenient aliphatic or carbocyclic hydrocarbon or mixture of such hydrocarbons, for instance petroleum distillates of suitable boiling point, aromatic hydrocarbons, for example benzene, toluene or xylenes or mixtures thereof, and hydroaromatic hydrocarbons for example cyclohexane and tetrahydronaphthalene. The selection of the hydrocarbon may be made, in any particular case, with due regard to the temperature at which it is necessary or desired to effect the reaction between the hydroxyalkylating agent and the amino compound. The reaction may be effected at the boiling point of the reaction materials or of the hydrocarbon or at lower or higher temperatures, if necessary under pressure. In some cases, particularly where epichlorhydrin is employed, the reactions are best effected in vessels made of or lined with materials which are inert towards the reacting substances.

The invention is applicable in effecting reactions between amines, particularly aromatic amines whether primary or secondary, and any desired hydroxyalkylating agents. Examples of such hydroxyalkylating agents are alkylene halogen-hydrins, for example ethylene chlorhydrin, propylene chlorhydrins, glyceryl mono- or dichlorhydrins, or chlorbutylene glycol, and alkylene oxides, for example ethylene oxide, propylene oxide or epichlorhydrin. Where halogen-hydrins are employed as hydroxyalkylating agents the reaction may in some cases be assisted by the presence of a substance capable of binding inorganic acid, for example sodium acetate, borax, sodium carbonate or the like.

Any desired or suitable amines, whether primary or secondary, may be hydroxyalkylated in accordance with the process of the invention. For example aliphatic amines e. g. iso-amylamine may be hydroxyalkylated. The invention has, however, been found particularly useful in the preparation of hydroxyalkylated derivatives of aromatic amines, especially amines of the benzene or naphthalene series. For example the invention may be applied in the preparation of derivatives from aniline, or α- or β-naphthylamine or their homologues or substitution products, whether substituted in the nucleus or in the amino group. Thus, for instance, 1-(α-naphthylamino)-3-chloro-propanol-2- may be prepared in very good yield and of a high degree of purity by boiling α-naphthylamine with epichlorhydrin in xylene solution or suspension, and 1-(α-naphthylamino)-ethanol-2- may be prepared in an analogous manner from α-naphthylamine and ethylene chlorhydrin.

The invention is illustrated but not limited by the following example:

*Example*

143 parts of α-naphthylamine, 100 parts of epichlorhydrin, and 125 parts of xylene are boiled under a reflux condenser for 12 hours in a vessel having a lining of glass, enamel or other inert material. The product is filtered off while hot and washed with a mixture of 100 parts of benzene and 35 parts of acetone, whereby 1-(-α-naphthylamino)-3-chloro-propanol-2- is obtained in good yield and of an excellent degree of purity. If desired the product may be further purified by recrystallizing from methylated spirit.

What we claim and desire to secure by Letters Patent is:

1. Process for the production of hydroxyalkylated derivatives of aliphatic and isocyclic aromatic amino compounds containing replaceable hydrogen attached to nitrogen, which comprises acting on an amino compound selected from the group consisting of isoamylamine and primary aromatic amines of the benzene and naphthalene series with an alkylene oxide in the presence of an inert hydrocarbon medium which is liquid under reaction conditions.

2. Process for the production of hydroxyalkylated derivatives of isoamylamine, which comprises acting on isoamylamine with an alkylene oxide in the presence of an inert hydrocarbon medium which is liquid under the reaction conditions.

3. Process for the production of hydroxyalkylated derivatives of primary aromatic amino compounds containing replaceable hydrogen attached to nitrogen, which comprises acting on a primary aromatic amine of the naphthalene series with an alkylene oxide in the presence of an inert hydrocarbon medium which is liquid under the reaction conditions.

4. Process for the production of hydroxyalkylated derivatives of α-naphthylamine, which comprises acting on α-naphthylamine with an alkylene oxide in the presence of an inert hydrocarbon medium which is liquid under reaction conditions.

5. Process for the production of hydroxyalkylated derivatives of α-naphthylamine, which comprises acting on α-naphthylamine with epichlorhydrin in the presence of an inert hydrocarbon medium which is liquid under reaction conditions.

6. Process for the production of 1-(α-naphthylamino)-3-chloro-propanol-2, which comprises acting on α-naphthylamine with epichlorhydrin in the presence of xylene.

HENRY CHARLES OLPIN.
SYDNEY HUBERT BANNISTER.